(12) United States Patent
Johnson

(10) Patent No.: US 6,266,625 B1
(45) Date of Patent: Jul. 24, 2001

(54) CALIBRATING HIGH RESOLUTION MEASUREMENTS

(75) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/274,721

(22) Filed: Mar. 23, 1999

(30) Foreign Application Priority Data

Jan. 29, 1999 (GB) .................................................. 9901893

(51) Int. Cl.[7] .................................................. G01D 18/00
(52) U.S. Cl. .............................. 702/89; 702/85; 702/176; 377/28; 377/29
(58) Field of Search .................................. 702/85, 89–90, 702/176–178; 377/20, 28–30; 968/839, 844, 846

(56) References Cited

U.S. PATENT DOCUMENTS

| | | | |
|---|---|---|---|
| 4,165,459 | * | 8/1979 | Curtice ................................... 702/79 |
| 4,611,926 | * | 9/1986 | Hayashi ................................... 368/20 |
| 4,719,375 | * | 1/1988 | Martin ..................................... 377/20 |
| 4,912,734 | * | 3/1990 | Frauenglass ............................ 377/20 |
| 5,333,162 | * | 7/1994 | Condreva ............................... 377/20 |

\* cited by examiner

*Primary Examiner*—Kamini Shah
*Assistant Examiner*—Bryan Bui
(74) *Attorney, Agent, or Firm*—Douglas W. Cameron; Anne Vachon Dougherty

(57) ABSTRACT

There is described a method and system for calibrating measurements, in particular for calibrating a high resolution counter against an accurate real time calibrated clock signal. The method comprising obtaining the calibrated low resolution clock measurement and the corresponding high resolution counter measurement and calculating a range of possible corrections to the counter measurement to align it with the clock measurement. The correction range is adjusted to make it consistent with a previously stored correction range and a value is taken from it to calibrate the counter measurement. If the calculated range and the stored range are inconsistent then only the calculated range is used. A further measurement of the clock or counter is taken to double check.

22 Claims, 5 Drawing Sheets

CALIBRATING HIGH RESOLUTION MEASUREMENTS

FIELD OF INVENTION

This invention relates to a method and system for calibrating high resolution measurements. In particular it relates to a method and apparatus of generating a high precision, high accuracy measurement from two measurements differing in precision and accuracy.

BACKGROUND OF INVENTION

The precision of a measurement is the smallest resolvable change. The accuracy of a measurement is how close the measurement is to the true value. The two are not the same.

An example of the problem to be solved is generating a high precision, high accuracy, time-of-day measurement, given two clocks. One is an accurate clock, but it only ticks at widely spaced intervals. This clock can sometimes be unpredictably resynchronized with a master clock, so causing step changes in the time. The other is a clock which ticks rapidly, but the time given is not directly related to the first clock, and that the actual rate it counts can drift from its nominal rate. It can also stop for unpredictable periods, for example if someone else uses it. The user wants a clock which gives the right time, but also ticks rapidly, allowing accurate measurements of short time intervals. The problem is to use both clocks to generate such information.

PRIOR SOLUTIONS

The simplest solution to acquire a real time measurement is to only use the high accuracy, low resolution clock (see FIG. 1A). This give an accurate measurement but gives low precision.

A more precise solution is to take a reading from the high accuracy low resolution clock and high resolution counter at the same time at the start (see FIG. 1B). Then read the counter and estimate the time by extrapolation from the time given by the clock at the first measurement. This extrapolation is referred to as a correction or calibration. This gives better precision and can be used to time short intervals. However this extrapolation will drift from the real time as the counter will drift and may also stop, giving persistent error thereafter. Furthermore any resynchronization of the clock to a master clock will not be detected or acted upon.

A third solution is shown in FIG. 1C. At each time measurement a note of the high and low precision times is made. If the low precision time is the same as the last low precision time measurement, then the time is extrapolated from the previous time measurement using the difference in high resolution counters. If the low precision time differs from the last measurement, then return the low resolution time, and save both times ready for the next measurement. This makes for an accurate measurement but precision is lost over measurements greater than one low resolution clock tick. The precision is lost because if the low resolution clock has changed since the last measurement then the low resolution clock is used to provide the time without any interpolation from the high resolution counter.

If the time is accessed from several program threads at once, then synchronization is needed to protect updates to the last measurement of high and low resolution time. Synchronization using semaphores can cause deadlocks or poor performance of a computer system.

This solution allows short time intervals to be measured provided the accurate clock does not change between the measurements. It synchronizes every timing measurement, but loses all the previous information about the offset between the accurate clock and the precision counter if the clock has changed.

Semaphores are mutual exclusion controls which allow programs with multiple threads of execution to be written such that two threads cannot update the same variable at the same time by making the threads get exclusive ownership of the semaphore before they update the critical resource.

A fourth solution, based on solution 2, is shown in FIG. 1D. Synchronization of the clock and counter take place at externally decided intervals. This gives generally high precision and reasonable accuracy. However it is complex, leads to loss of precision when resynchronized because the resynchronizations may not occur at the same time interval after a clock tick. It is also difficult to decide how often to resynchronize. A semaphore may be required to protect the clock offset value.

SUMMARY OF INVENTION

According to one aspect of the invention there is provided a method of measurement calibration comprising:

obtaining a calibrated low resolution measurement;

obtaining a high resolution measurement;

calculating a range of possible corrections to the high resolution measurement to align it with the low resolution measurement;

adjusting the correction range to make it consistent with a previously stored correction range; and calibrating the high resolution measurement with a value taken from the correction range.

This gives good accuracy and precision. The accuracy must be in the range allowable by the high accuracy clock. The counter can measure small time intervals, even after a long interval between time measurements when operating correctly. However disruption can cause the calibration of the counter to be lost.

For each time measurement, record the high resolution time, low resolution time, then the high resolution time. Calculate the upper and lower bounds of the correction factor to go from the first high resolution time to the real time, at the time the high resolution time was taken given that it must be in a range determined by the low resolution high accuracy time and the tick interval. Combine these limits with previously generated limits, so that both limits are true. If the limits are irreconcilable, then use the current limits. Use the first high resolution timestamp and the lower of the limits to generate the final time.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

A system which would use this invention is an IBM compatible Personal Computer with a real time clock or operating system maintained clock with a precision of say 32 milliseconds and an interval timer or counter/timer chip with a counter frequency of perhaps 1 MHz or an Intel Pentium microprocessor cycle counter, but without the count being synchronized to any real time clock. This invention could be implemented in software with the reading of the accurate and precision clocks being made by the appropriate operating system calls, an example of a program with comments is given at the end of the specification. A hardware example of the invention is described directly below.

Figure 1A:
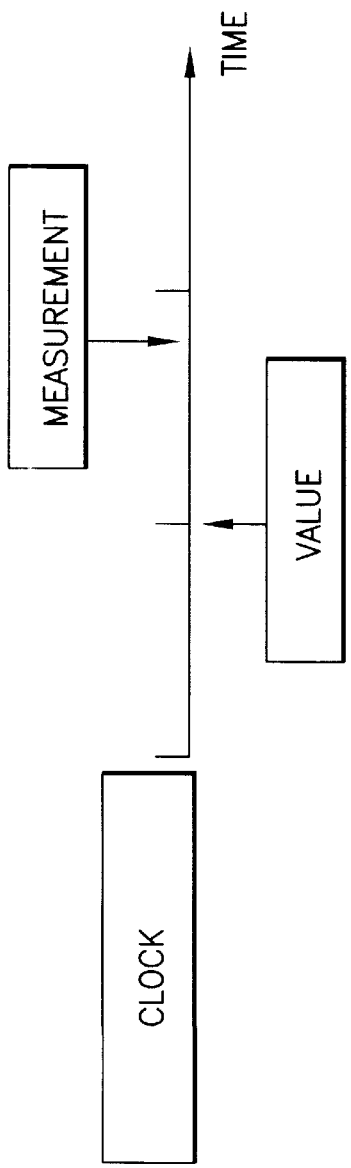
FIGS. 1A,B,C,D are timing diagrams of prior art timing solutions.
Figure 1B:
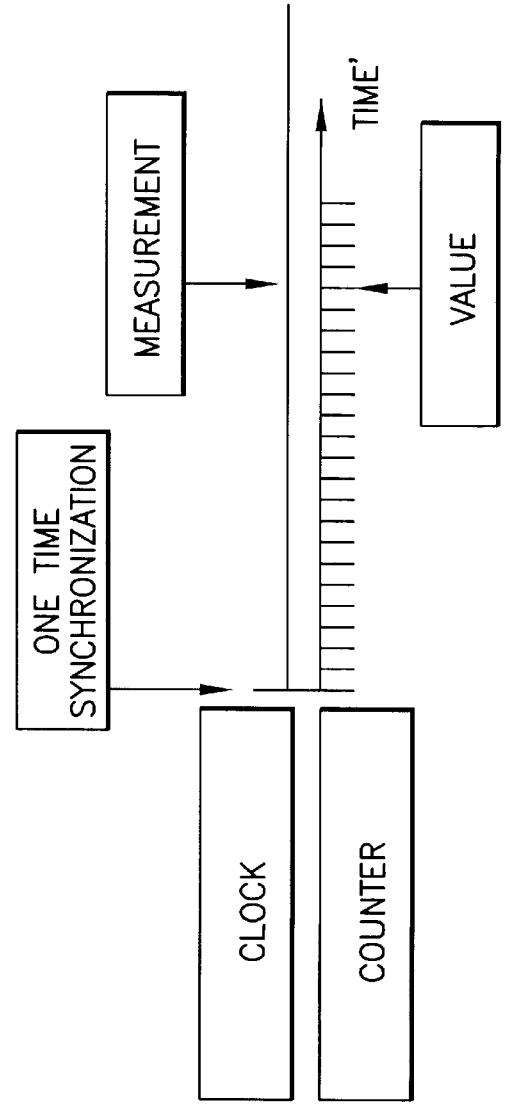
Figure 1C:
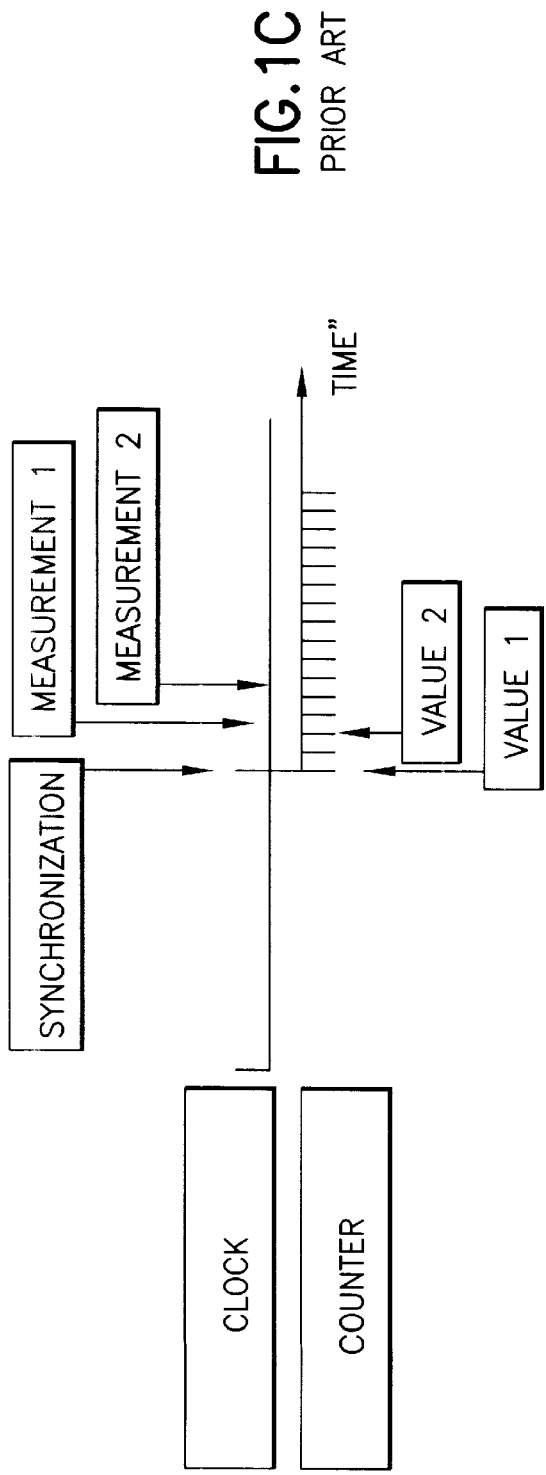
Figure 1D:
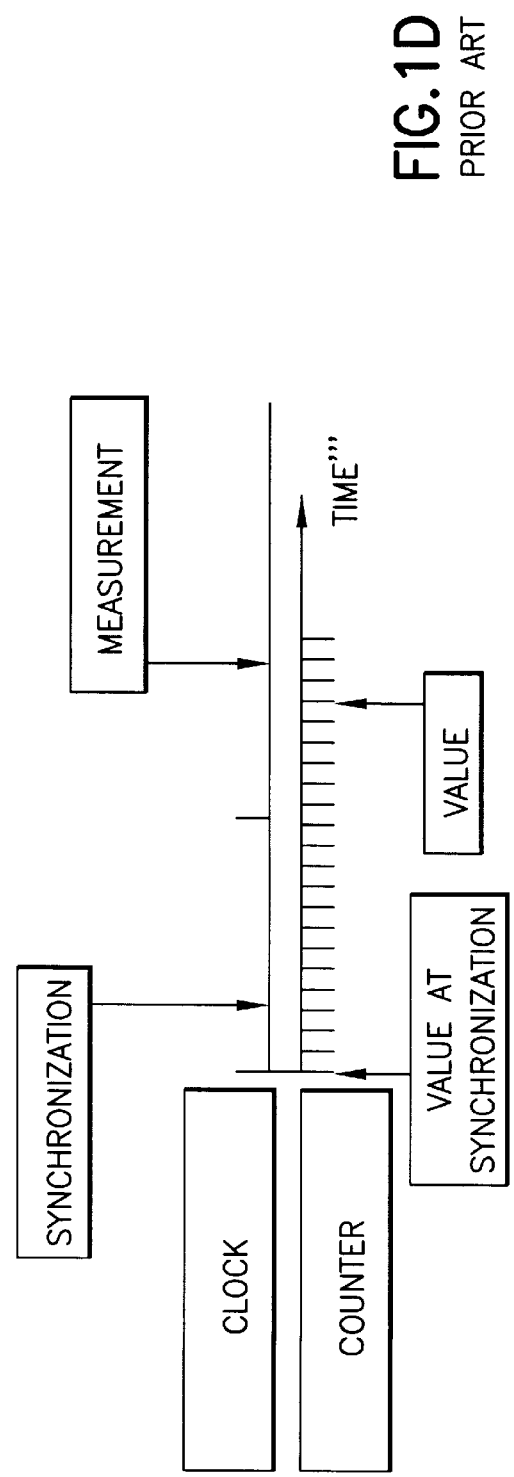
Figure 2:
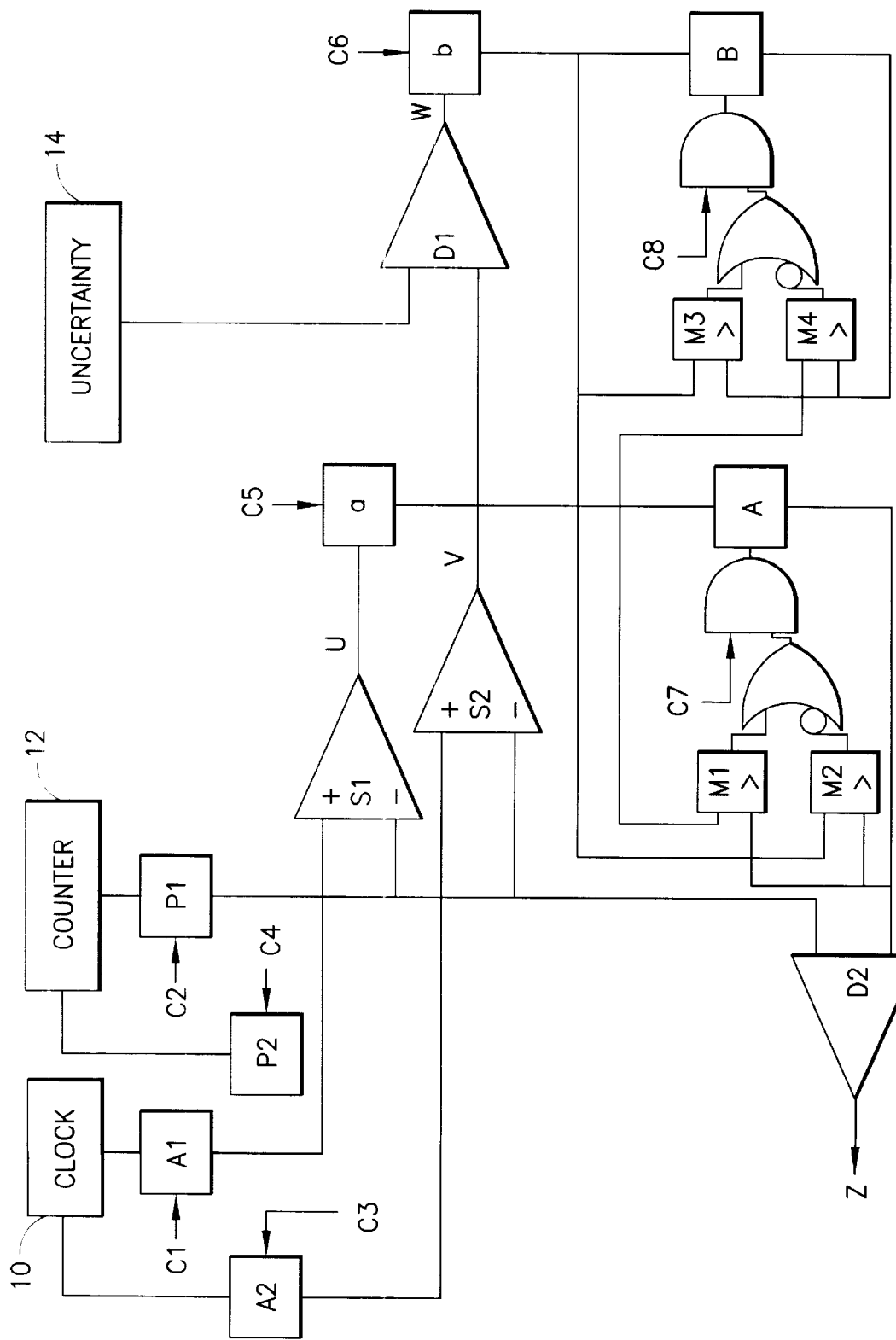
FIG. 2 is an embodiment of the present invention.

A circuit embodying the invention comprises clock 10 and counter 12 connected to subtractors S1 and S2 via registers A1,A2,P1,P2 (see FIG. 2). Output U from subtracter S1 feeds into register a. Output V from subtracter 52 is added to a predetermined uncertainty value 14 by adder D to give output W into register b. Clock 10 gives measurements in real time and does not stop counting, even when the housing system is switched off. As an example only it keeps an accurate count of the number of seconds that have passed since a particular day/month/year and can therefore give the actual day/month/year and hours:minutes and seconds. Counter 12 gives measurements from an arbitrary time, for instance when the counter was switched on. As an example only it may count in milliseconds continuously from when it is switched on to when it is switched off. In a more realistic example the clock may count in units of 32 milliseconds and the counter in units of 4 milliseconds. In both examples it can be seen that the clock keeps actual time but is not as precise as the counter which counts with higher resolution. Sequential timing signals C1, C2, C3, C4, C5, C6 are incident on registers A1, P1, A2, P2, a, b, so that they may latch signals from clock 10, counter 12, subtracter S1 and adder D1.

Comparators M1 and M2 and associated logic take their inputs from registers a and b and give output to conditionally latch register A. Comparators M3 and M4 and associated logic take their inputs from register a and b and give output to conditionally latch register B. Adder D2 receives input from the counter register P1 and register A to give the final output as Z.

Figure 3:
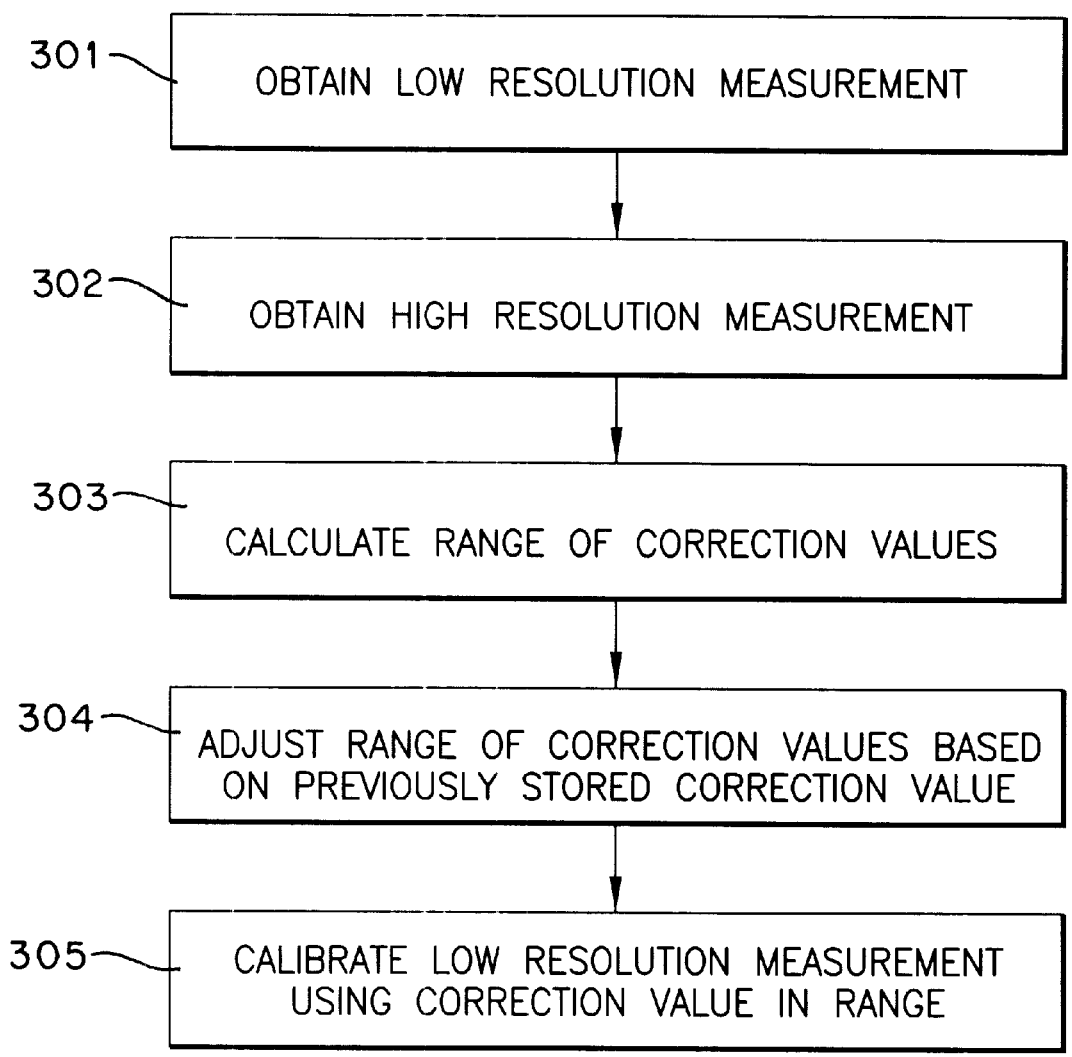
FIG. 3 is a flow chart of the present embodiment.

With reference to FIGS. 2 and 3, a reading from clock 10 is taken by latching the current value using timing signal C1 into register A1 at 301. A reading from counter 12 is then taken by latching the current value using timing signal C2 into register P1 at 302. A second reading from clock 10 is taken by latching the current value using timing signal C3 into register A2. The difference between the values held in registers A1 and P1 is taken using subtracter S1 to give value U. The value U is latched using timing signal C5 into register a. This is an estimate of lower bound of the offset between the clock and the counter (the lower correction factor). The difference between the values held in registers A2 and P1 is taken using subtracter S2 to give value V. The precalculated sum of the uncertainties due to tick intervals in the clock and counter is added to value V by adder D1 to give value W. V is an intermediate result. The precalculated uncertainty is the sum of the tick intervals of the clock and the counter plus 1 unit. The range of correction values is calculated at 303 based on the higher and lower correction factors.

The value W is latched using C6 into register b. This is an estimate of upper bound of the offset between the counter and the clock. Using the comparators M1 and M2 and associated logic the value in register a is latched into register A when signal C7 occurs if, and only if, the value in register a is more than the current value of register A or if the value in register b is not more than the current value of register A. This is an combined estimate of lower bound of the offset between the counter and the clock based on the previous and current estimates of the offset. Using the comparators M3 and M4 and associated logic the value in register b is latched into register B when clock signal C8 occurs if, and only if, the current value in register B is more than the value of register b or if the current value in register B is not more than the value of register a. This is an combined estimate of upper bound of the offset between the counter and clock based on the previous and current estimates of the offset. The range is, therefore, adjusted at 304. A better estimate of the time is made at 305 by adding the latched value of the counter held in register P1 to the combined lower bound estimate of the offset between the counter and clock held in register A by the adder D2 to give the result Z.

Some of the possible variants are now mentioned. Value V can be calculated by calculating the difference between A2 and A1, then adding this value to U. Value U can be calculated by first latching a value from the counter 10 into P1 using C2, then by latching the value of the clock 12 into A1 using C1. V is then calculated by latching a second value from the counter into P2 using C4, then calculating the difference V between A1 and P2. Alternatively variant 2 can be used where value V is calculated by calculating the difference between P2 and P1, then adding this value to U. The final result Z can be calculated by adding P1 to some combination of A and B, e.g. just B or (A+B)/2. If variant 2 is used then the final result Z can be calculated by adding P2 to some combination of A and B, e.g. just A or just B or (A+B)/2.

If the clock 10 is subject to political time changes (time zone changes or starting or ending of daylight savings time) and these changes are separately added to the value of the clock then the necessity for resynchronization of the clock and counter after such a change can be removed. The political time offset is added to the final value Z rather than by adding the political offset to the clock value before it is latched in registers A1 or A2. The necessity to take a second measurement of either the clock or counter can be removed most of the time if W is temporarily calculated using as just U added to the uncertainty. If the latched values of U and V in registers a and b are such that a<=A and B<=b so that the values of A and B are not going to be changed then the previous values of A (and B) can be used to calculate the final time Z. If the value U and temporary value of V would cause A and B to be changed then a second time measurement of either the clock or counter is required and processing continues as originally explained above.

Figure 4:
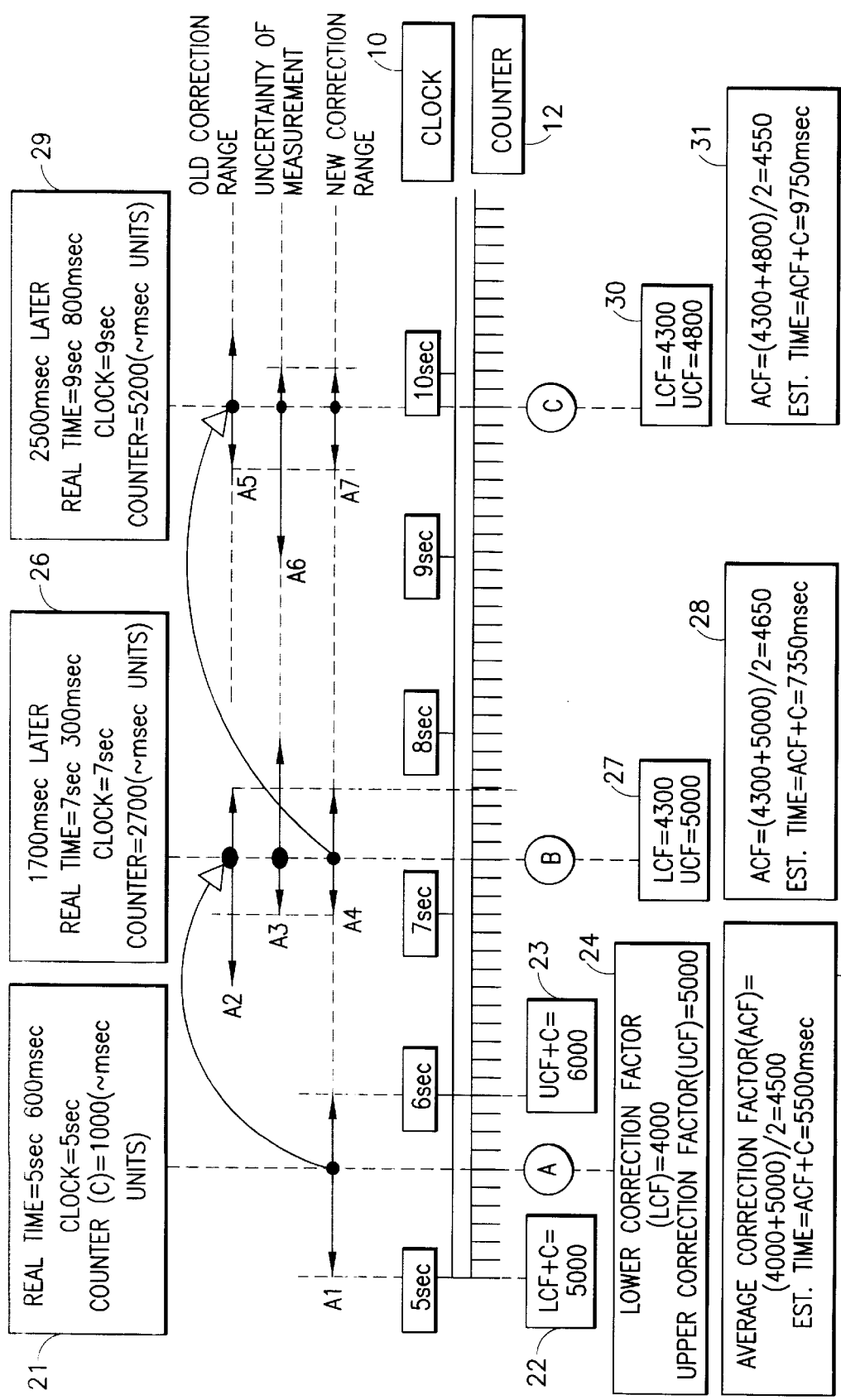
FIG. 4 is a timing diagram of the present embodiment.

An example of the embodiment in use is now described with relation to FIG. 4. For simplicity it is assumed that the clock intervals are seconds which are calibrated to actual time and the counter intervals are more precise milliseconds. The clock intervals are shown in darker lines above the higher precision counter intervals. At time A, the real time is 5 sec 600 msecs, the clock measures 5 sec and the counter measures 1000 millisecond units (box 21). The possible times, according the clock, could be any value from 5sec to 6 sec, which is 5000 msec to 6000 msec units. This is shown in on the diagram by doubled headed arrow A1 between the 5 and 6 sec marker. This corresponds to a lower correction factor plus the counter measurement and an upper correction factor plus the counter measurement (box 22,23). Calculating back gives the correction range, a lower correction factor of 4000 and an upper correction factor of 5000 (box 24). One way of estimating the time is to the average correction factor (ACF) to the counter (C), in this case the estimated time is 5500 ms which is 100 ms off (box 25).

At time B, 1700 msec later, the real time is 7 sec 300 msec, the clock reads 7 sec and the counter reads 2700 (box 26). The previous correction range (4000/5000) is shown superimposed on the new counter reading as arrow A2. The possible values for the new time are shown by arrow A3 as between 7 and 8 Sec. The new correction range, represented by arrow A4, takes the interception of the old correction range A2 and the probable values (uncertainty in the clock value) A3. The clock measurement lies between 7 and 8 sec. LCF=lower clock uncertainty—counter measurement =7000−2700=4300; the new LCF becomes 4300 since 4300 is greater than the previous LCF of 4000. UCF=upper clock uncertainty—counter=8000−2700=5300; but since the previous UCF is smaller than this value the UCF remains the same as the previous time. LCF=4300 and UCF=5000 (box 27). The average correction factor=(4300+5000)/2=4650 and the estimated time is calculated as 4650+2700=7350 msec. The estimated time is only 50 msec out.

At time C, 2500 msec later, the real time is 9sec 800 msec, the clock reads 9 sec and the counter reads 5200 millisecond units (box 29). The previous correction range (4300/5000) is shown superimposed on the new counter reading as arrow A5. The possible values for the new time are shown by arrow A6 as between 9 and 10 sec. The new correction range, represented by arrow A7, takes the interception of the old correction range A5 and the probable values (uncertainty in the clock value) A6. LCF=lower clock uncertainty—counter measurement =9000−5200=3800; the LCF remains at 4300 because this is greater than 3800. UCF=upper clock uncertainty—counter=10000−5200=4800; since the new UCF (4800) is smaller than the old value (5000) the UCF becomes 4800. LCF=4300 and UCF =4800 (box 30). The average correction value=(4300+4800)/2=4550 and the estimated time is calculated as 4550+5200=9750 msec (box 31). This estimated time is only 50 msec out from the real time.

An example of program code used in an embodiment of the invention is given below.

```
#define LLF(h,1) (4294967296.0*(h) + (1))
/* Get the 32-bit linear address of the global
information segment */ static ULONG
*getInfoSegAddress (void) {
    USHORT p1 = 0, p2;
    ULONG *r = 0;
    APIRET16 APIENTRY16 Dos16GetInfoSeg(USHORT *p1, USHORT
*p2)
    APIRET16 rc;
    rc = Dos16GetInfoSeg(&p1, &p2);
    if (rc == 0) r = (ULONG *)MAKEP(p1, 0);
    return r;
}
int64_t
sysTimeMillis(void)
{
#define MIN_CLOCK_RES 10 /* Default minimum required
clock res. in milliseconds
*/
#define PW2T32 (4294967296.0)
#define READATOMIC(a, b) ((a) = (b))
#define WRITEATOMIC(a, b) ((a) = (b))
#define MAXERROR 1000 /* Maximum deviation from time
since boot to local time
*/
    APIRET rc;
    static volatile double storeLocalTimeOffset; /* GMT ->
local */
    static volatile double storeGmtMillisAtBoot;
    ULONG l[3], l1;
    static ULONG *pGInfoSeg; /* Address of the global
information segment */
    double localTimeOffset;
    double gmtMillisAtBoot;
    double nowGmtMillis, localTime;
    double error;
    static volatile double storeA; /* Stored upper and
lower limits for hi->lo conversion
*/
    static volatile double storeB; /* Stored upper and
lower limits for hi->lo conversion
*/
    static int lowResPrec = 0;
    double h1, l1, l2;
    double a, b; /* current upper and lower limits
for hi->lo conversion */
    double oldA, oldB; /* previous upper and lower limits
for hi->lo conversion */
    double offs; /* Offset from h1 -> accurate time
*/
    double res; /* final time to return */
    static double highResPeriod;
    QWORD nowHighRes;
    double lowTime, highTime;
    long lLowTime, lHighTime;
```

-continued

```
    static ULONG ticks=0; /* ticks per second
(constant) */ int64_t ret;
    /* Complex code below get us the accurate, but low
precision value milliseconds since Midnight GMT 1 January
1970 */
    /* First time? */
    if (lowResPrec == 0) {
        /* Get low resolution time-since-boot timer
precision */
        ULONG interval;
        const char *cMinRes;
        int minRes;
        if (DosQuerySysInfo(QSV_TIMER_INTERVAL,
QSV_TIMER_INTERVAL
                            &interval, sizeof interval) ==
0) {
            /* Round 0.1ms interval up to ms, and allow for
clock having 1ms resolution */
            lowResPrec = (interval + 9)/10 + 1;
        } else {
            lowResPrec = 32;
        } /* endif */
        /* Find the minimum required clock resolution */
        minRes = MIN_CLOCK_RES;
        /* High resolution counter */
        /* Note: Dos sessions use the hi-res timer, too. */
        /* Force fast path for speed, but low clock
resolution */
        if (lowResPrec > minRes && DosTmrQueryFreq(&ticks)
        == 0) {
            highResPeriod = 1000.0/ticks;
        } else {
            ticks = 0;
        }
        PGINFOSEG = getInfoSegAddress();
    }
    READATOMIC(localTimeOffset, storeLocalTimeOffset);
    READATOMIC (gmtMillisAtBoot, storeGmtMillisAtBoot);
    if (PGINFOSEG) {
        /* Fast path */
        /* Loop to ensure consistent results */
        do {
            1[0] = PGINFOSEG[1];
            1[1] = PGINFOSEG[0];
        } while (1[0] != PGINFOSEG[1] || 1[1] !=
        PGINFOSEG[0]); /* enddo */ 1[2] = 0;
    } else {
        DosQuerySysInfo(QSV_MS_COUNT, QSV_TIME_HIGH, 1,
        sizeof 1);
    } /* endif */
    /* Use milliseconds since boot field */
    nowGmtMillis = (double)1[0] + gmtMillisAtBoot;
    /* Seconds since 1 January, 1970 (local time?) */
    localTime = LLF(1[2], 1[1]);
    error = nowGmtMillis - (localTime -
        localTimeOffset) *1000;
    /* Has the local time changed? (test relative to time
since boot) */ if (fabs(error)
    >= MAXERROR) {
        /* Wrap of milliseconds counter? */
        if (fabs(error + LLF(1, 0)) < MAXERROR) {
            /* We don't want to go through the other code
below, in case the counter
wraps, */
            /* we go through Daylight saving transition, and
the local time h as not been */
            /* reset. In that case, mktime would give the
wrong answer as the C runtime */
            /* will detect the daylight saving change, but
the local time input to it is */
            /* wrong */
            /* Adjusting the gmtMillis may still allow
things to work */ /* Adjust for
wrap */
            gmtMillisAtBoot += LLF(1, 0);
            WRITEATOMIC (storeGmtMillisAtBoot,
gmtMillisAtBoot);
            nowGmtMillis += LLF(1, 0);
        } else {
```

-continued

```
                /* We only want to be in here if the local time
        is correct, and the TZ */
                /* environment variable is correct */
                ULONG 12[3];
                DATETIME dt;
                time_t t1;
                struct tm t;
                /* Get a consistent timestamp and hundredths
        counter */
                do {
                        DosGetDateTime(&dt);
                        DosQuerySysInfo(QSV_MS_COUNT, QSV_TIME_HIGH,
                    12, sizeof 12);
    } while (memcmp(1, 12, sizeof 1) != 0 && (memcpy(1, 12,
sizeof 1), 1)); /* enddo */
                t.tm_sec = (int) dt.seconds;
                t.tm_min = (int) dt.minutes;
                t.tm_hour = (int) dt.hours;
                t.tm_mday = (int) dt.day;
                t.tm_mon = (int) dt.month - 1;
                t.tm_year = (int) dt.year - 1900;
                t.tm_wday = 0;
                t.tm_yday = 0;
                t.tm_isdst = -1; /* determine from
            environment */
                /* Return GM time based on local time */
                /* Rely on POSIX mktime where time_t = seconds
                    since 1 Jan 1970 GMT */
                if (t.tm_year < 138) {
                        t1 = mktime(&t);
                } else {
                        /* Try to work around compiler bug of dates
                    with year >= 2038 */
                        /* This breaks horribly at 2100 (not a leap
                    year!), but */ /* OS/2
            doesn't currently support dates >= 2080 */
                        t.tm_year -= 44;
                        t1 = mktime(&t) + 44 * 365.25 * 24 * 60 * 60;
                } /* endif */
                nowGmtMillis = (double)t1*1000 +
    dt.hundredths*10;
                /* Remember the correction factors */
                gmtMillisAtBoot = nowGmtMillis - 1[0];
                WRITEATOMIC (storeGmtMillisAtBoot,
gmtMillisAtBoot);
            localTime = LLF(1[2], 1[1]);
            /* Needed to check the GMtime against the local
time */
            localTimeOffset = localTime - t1;
            WRITEATOMIC (storeLocalTimeOffset,
localTimeOffset);
        } /* endif */
    } /* endif */
    /* Complex code above has now got us the accurate, but
low precision value of
        milliseconds since Midnight GMT 1 January 1970 */
    l1 = nowGmtMillis;
    /* Get the high resolution time */
    if (ticks != 0 && DosTmrQueryTime(&nowHighRes) == 0) {
        h1 = LLF(nowHighRes.ulHi, nowHighRes.ulLo) *
highResPeriod;
    } else {
        /* So drops through */
        h1 = l1;
    }
    /* Now we combine the accurate and the precise (high
resolution) times according to
the
        invention */
    /* Get lowest possible estimate correction factor of
high res -> low res */
    a = l1 - h1;
    /* Get highest possible estimate correction factor of
high res -> low res */
    /* Assuming for the moment no gap between the two
measurements */ b = a +
lowResPrec;
    /* Get previous limits to correction factor */
    READATOMIC(oldA, storeA);
```

-continued

```
    READATOMIC(oldB, storeB);
    if (a <= oldA && oldB <= b) {
        /* fast path */
        /* a B */
        offs = oldA;
        l1 = l[0];
    } else {
        /* A possible disagreement in the upper and lower bounds */
        /* So bracket the high res call with the low res in case of delay between */
        /* the first two measurements */
        /* See if low resolution time has changed */
        DosQuerySysInfo(QSV_MS_COUNT, QSV_MS_COUNT, &l1, sizeof l1);
        /* Widen limits */
        b += l1 - l[0];
        /* Get previous limits to correction factor */
        /* second time in case updated by another thread */
        READATOMIC(oldA, storeA);
        READATOMIC(oldB, storeB);
        /* Try to match the current correction factor limits [a,b) with the */
        /* previous ones [A,B) */
        /* In case of irreconcilable conflict, the current values are chosen */
        /* Use the lowest possible combined factor as a basis to calculate the */
        /* time */
        if (a <= oldA) {
            if (oldB <= b) {
                /* a B */
                offs = oldA;
            } else {
                WRITEATOMIC(storeB, b);
                if (oldA < b) {
                    /* a b */
                    offs = oldA;
                } else {
                    /* a b A B */
                    WRITEATOMIC(storeA, a);
                    offs = a;
                    /* Current and previous limits disagree */
                } /* endif */
            } /* endif */
        } else {
            WRITEATOMIC(storeA, a);
            if (a < oldB) {
                if (b < oldB) {
                    /* This can occur if A and B are wide apart because they */ /*
were calculated from widely spaced h1 and h2 */
                    /* A b */
                    WRITEATOMIC(storeB, b);
                } else {
                    /* A B */
                } /* endif */
            } else {
                /* A B a b */
                WRITEATOMIC(storeB, b);
                /* Current and previous limits disagree */
            } /* endif */
            offs = a;
        } /* endif */
    } /* endif */
    /* Generate the final, accurate, time */
    res = h1 + offs;
    /* Convert to 64 bit integer */
    highTime = res * (1/PW2T32);
    Lhightime = (long)highTime;
        lowTime = res - Lhightime * PW2T32;
        Llowtime = (unsigned long)lowTime;
        ret = l1_or(l1_shl(uint2l1(Lhightime), 32), uint2l1 (Llowtime));
        return ret;
}
```

Now that the invention has been described by way of preferred embodiments, various modifications and improvements will occur to those person skilled in the art. Therefore it should be understood that the preferred embodiment has been provided as an example and not as a limitation.

What is claimed is:

1. A method of time measurement calibration comprising:
   obtaining at least one original calibrated low resolution time measurement;
   obtaining at least one original high resolution time measurement;
   calculating a range of possible corrections to the at least one high resolution measurement to align the high resolution measurement with the at least one low resolution measurement; and
   calibrating the high resolution measurement with a value taken from the correction range.

2. The method of claim 1 wherein is stored a previously calculated correction value and further comprising adjusting the correction range to make the correction range consistent with a previously stored correction range.

3. A method as claimed in claim 2 further comprising replacing the previously stored correction range with the calculated range.

4. A method as claimed in claim 3 further comprising:
   using the calculated range without adjustment if the calculated range differs from the previously stored correction range by more than a predetermined amount.

5. A method as claimed in claim 4 comprising:
   when only one original low resolution measurement is obtained, obtaining a further low resolution measurement;
   determining whether the original and further low resolution measurements agree; and
   starting the method over if the two low resolution measurements do not agree.

6. A method as claimed in claim 4 comprising:
   when only one original high resolution measurement is obtained, obtaining a further high resolution measurement;
   determining whether the original and further high resolution measurements agree; and
   starting the method over if the two high resolution measurements do not agree.

7. A method as claimed in claim 4 comprising:
   when only one original low resolution measurement is obtained, obtaining a further low resolution measurement;
   determining whether the original and further low resolution measurements agree; and
   if the measurements do not agree, recalculating the range of possible corrections based on the original and further low resolution measurements.

8. A method as claimed in claim 4 comprising:
   when only one original high resolution measurement is obtained, obtaining a further high resolution measurement;
   determining whether the original and further high resolution measurements agree; and
   recalculating the range of possible corrections based on the original and further low resolution measurements.

9. A method as claimed in claims 8 wherein the low resolution measurements are taken from a real time clock and the high resolution measurements are taken from a precision counter.

10. A method as claimed in claims 9 wherein the correction range is checked for consistency using the intersection of the correction range with a previously stored correction range.

11. A method as claimed in claim 10 wherein the step of obtaining a correction range comprises:
    obtaining the highest and lowest correction factors for the high resolution measurement based on the uncertainty of the low resolution.

12. A method as claimed in claim 11 wherein the step of adjusting the correction range comprises:
    using the higher of lowest correction factors as the final lower correction factor and the lower of the highest correction factors as the final higher correction factor.

13. A method as claimed in claim 12 further comprising calibrating the measurement by combining the high resolution measurement with the lowest value in the correction range.

14. A method as claimed in claim 12 further comprising calibrating the measurement by combining the high resolution measurement with the highest value in the final error range.

15. A method as claimed in claim 12 further comprising calibrating the measurement by combining the high resolution measurement with an average value in the final error range.

16. A system of time measurement calibration comprising:
    means for obtaining at least one original calibrated low resolution time measurement;
    means for obtaining at least one original high resolution time measurement;
    means for calculating a range of possible corrections to the at least one high resolution measurement to align the high resolution measurement with the at least one low resolution measurement; and
    means for calibrating the high resolution measurement with a value taken from the correction range.

17. A system as claimed in claim 16 wherein the low resolution measurement is taken from a real time clock and the high resolution measurement is taken from a precision counter.

18. A system as claimed in claim 16 further comprising:
    storage means for storing a previously determined correction range; and
    means for checking the correction range for consistency based on the intersection of the correction range with the previously stored correction range.

19. A system as claimed in claim 16 further comprising:
    storage means for storing a previously calculated correction range; and
    means for adjusting the correction range to make it consistent with a previously stored correction range.

20. A system as claimed in claim 19 further comprising a means for replacing the previously stored correction range with the calculated range.

21. A system as claimed in claim 20 further comprising means for determining if the calculated range can not be made consistent with the previously stored correction range by determining if the calculated range differs from the previously stored correction range by more than a predetermined amount.

22. A system as claimed in claim 21 means for determining if the original and a further measurement agree.

* * * * *